Oct. 18, 1966  R. A. HYMAN ETAL  3,280,333
RADIATION SENSITIVE SELF-POWERED SOLID-STATE CIRCUITS
Filed Oct. 12, 1961  4 Sheets-Sheet 1
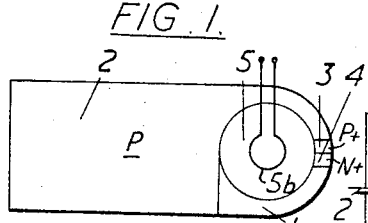
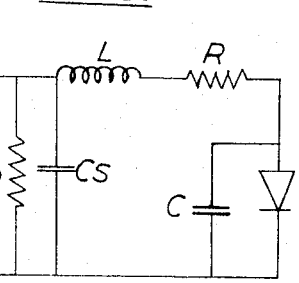
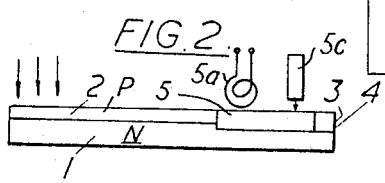
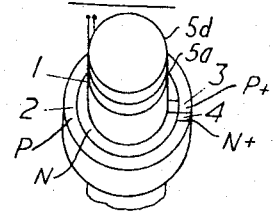
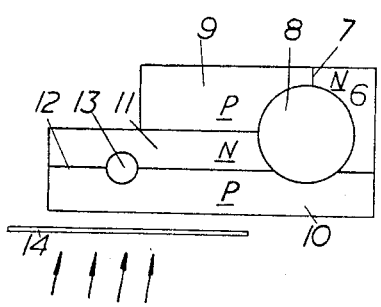
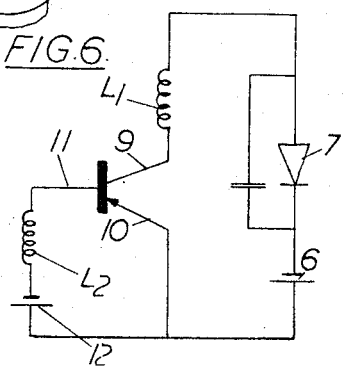
Inventors
Robert A. Hyman
Arthur D. Thomas
By
Attorney Oct. 18, 1966
R. A. HYMAN ETAL
3,280,333
RADIATION SENSITIVE SELF-POWERED SOLID-STATE CIRCUITS
Filed Oct. 12, 1961
4 Sheets-Sheet 2
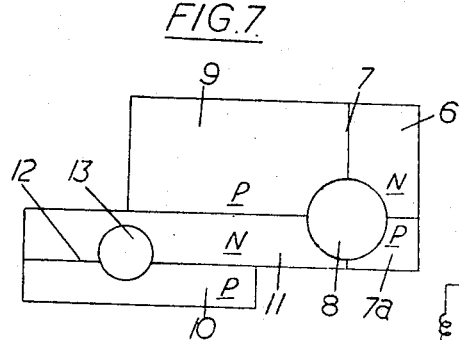
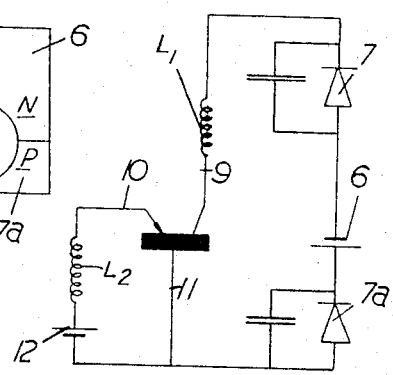
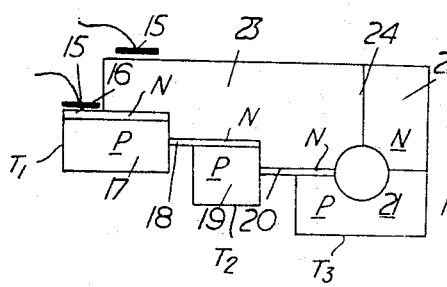
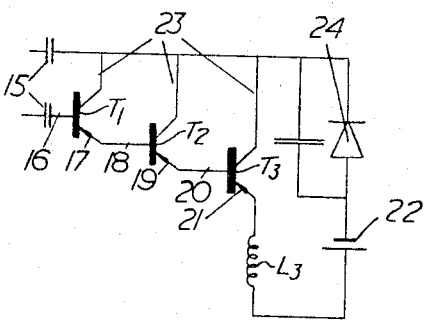
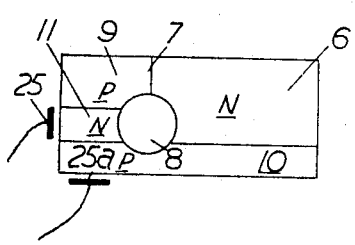
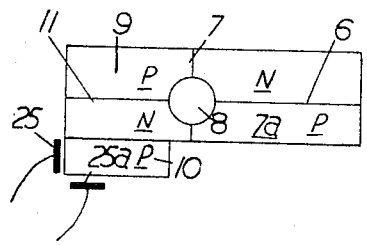
*Inventors*
Robert A. Hyman
Arthur J. Thomas
By
*Attorney*

Oct. 18, 1966 R. A. HYMAN ETAL 3,280,333
RADIATION SENSITIVE SELF-POWERED SOLID-STATE CIRCUITS
Filed Oct. 12, 1961 4 Sheets-Sheet 3

Inventors
Robert A. ...
Arthur D. ...
By ...
Attorney

United States Patent Office 3,280,333
Patented Oct. 18, 1966

3,280,333
RADIATION SENSITIVE SELF-POWERED SOLID-STATE CIRCUITS
Robert Anthony Hyman and Arthur Derrick Thomas, London, England, assignors to International Standard Electric Corporation, New York, N.Y., a corporation of Delaware
Filed Oct. 12, 1961, Ser. No. 144,649
Claims priority, application Great Britain, Oct. 14, 1960, 35,315/60
14 Claims. (Cl. 250—212)

This invention relates to semiconductor solid-state circuits.

One of the difficulties encountered in manufacturing semiconductor devices is that of providing efficient ohmic connections so that the devices may be readily incorporated in an external circuit. Another problem is that semiconductor devices require hermetic sealing, usually achieved by encapsulation of the complete device.

It is an object of the present invention to provide semiconductor devices which constitute completely self-contained circuits which do not require external ohmic connections and do not require expensive or complicated encapsulation for protection. According to the invention a semiconductor circuit includes components of desired characteristics arranged in geometric relationship with each other, each component being in contact with one or more of the other components, the semiconductor circuit being provided with means for coupling it inductively to an external circuit. The semiconductor circuit may alternatively or additionally be coupled to the external circuit by capacitative means.

The semiconductor circuit may be powered by one inductive or capacitative coupling with an external circuit and may transmit its output via another inductive or capacitative coupling to the same or another external circuit.

In one form of semiconductor circuit according to the invention the circuit is self-powered so that the only coupling with an external circuit is that required to deliver the output of the semiconductor circuit. For example, it can be powered by means of an integral solar battery, or perhaps a radioactive-sensitive element.

More particularly, a semiconductor circuit according to the invention comprises one or more major semiconductor elements in combination formed to provide a distinct block of electronic circuitry capable of being coupled inductively or capacitatively with an external circuit, the major semiconductor elements being of desired shape and characteristics and having regions thereof treated to form minor semiconductor elements, as by the diffusion of impurities or any other means, the minor semiconductor elements being of the desired shapes and characteristics and being so disposed geometrically with relation to each other and to the remaining portions of the major semiconductor elements as to form well known electronic circuit components as parts of the said distinct block of electronic circuitry. The various semiconductor elements inherently comprise electrodes which form self-contained devices and portions of the circuitry within the block.

In one form, a semiconductor circuit according to the invention comprises a piece of semiconductor material with particular characteristics, formed with a hole through it, around which is created the required electronic circuit. Part of the piece of semiconductor material is treated to produce regions of material with different characteristics so arranged geometrically that, for instance, they form a tunnel diode and a solar battery in one common circuit. The various elements of the circuit are so arranged having regard to their particular characteristics that, in the present example, they form a completely self-contained, self-powered tunnel-diode oscillator. The necessary resistances, inductances and capacitances in the circuit are provided by the particular shaping or treating of the various regions of the original piece of semiconductor material around the said hole. The completed device constituting the circuit can be provided with an overall protective coating, for example, an oxide layer. The complete semiconductor circuit can now be inductively coupled by means of suitable coils to an external circuit. For example, a coil may be placed within the hole in the semiconductor material which is providing the loop circuit around which the electronic currents flow. Alternatively a capacitative coupling can be used. This may be achieved by "printed-circuit" or evaporation techniques to provide the necessary capacitative coupling means on the exposed surface of the protective oxide layer.

In another form of semiconductor circuit according to the invention, the hole in the semiconductor material may be filled with material such as a ferromagnetic section or a section of highly resistive semiconductor material with different characteristics from those of the surrounding material. This type of circuit could be made, according to another aspect of the invention, by forming semiconductor materials around a long rod or core of suitable material and then producing individual semiconductor circuit devices by cutting off slices of the required thickness from the basic rod and the associated semiconductor materials formed thereon.

In the latter form of construction, i.e. with a solid filling in the hole, extra circuit components can be provided across the outer surfaces of the said solid filling. For example, the circuit could be made with a tunnel triode or tetrode instead of a diode.

In order that the invention may be more clearly understood, certain preferred forms are now described with reference to the accompanying drawings in which:

FIG. 1 shows a plan view of a self-powered tunnel-diode circuit and

FIG. 2 shows a side elevation of FIG 1, and

FIG. 3 shows a typical circuit diagram for the device depicted in FIGS. 1 and 2.

FIG. 4 shows an alternative version of FIG. 1.

FIG. 5 shows a form of self-powered transistor amplifier, and

FIG. 6 shows a typical circuit diagram for FIG. 5.

FIG. 7 shows another form of the amplifier depicted in FIG. 5, and

FIG. 8 shows the equivalent circuit diagram for FIG. 7.

FIG. 9 shows a multiple amplifier, and

FIG. 10 is the equivalent circuit diagram for FIG. 9.

FIG. 11 shows an alternative form of amplifier.

FIG. 12 shows yet another form of amplifier.

Figure 13:
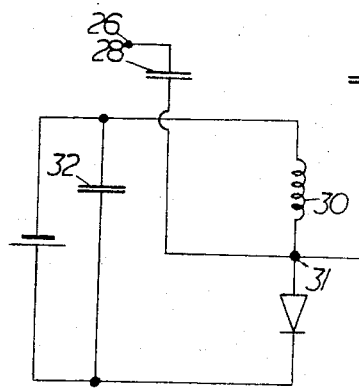
FIG. 13 shows a circuit for a tunnel diode with an entirely capacitative signal coupling.

Referring to the drawings, in FIGS. 1 and 2 there is shown a semiconductor device comprising a body 1 of semiconductor material with a p-type layer 2 produced thereon by diffusion. A very heavily doped region of p-type material, designated p+, is formed at 3 and a correspondingly heavily doped region of n-type material (n+) is formed at 4. The basic body 1 is formed with a hole 5 so that the tunnel diode created by the p-n junction at 3 and 4, comprising input and output electrodes of the diode, is contained in a circuit of semiconductor material around the hole 5. The p-type layer 2, together with the junction with body 1, forms a photo-voltaic cell which powers the circuit, and the complete device is coated with a protective oxide layer. Connection to the circuit around the hole 5 can be either by induction or capacitance. A coil 5a can be placed coaxially with the loop around the hole 5 or alternatively a coupling inductor 5b can be "printed" on top of the oxide layer by using "printed-circuit" techniques. A ferrite slug 5c may be inserted in the hole 5 (and may make a closed magnetic circuit) to improve coupling and act as a fine tuning arrangement. Capacitance coupling is illustrated in FIGS. 9, 11, and 12. The natural oscillating frequency of the circuit will be determined by the elements in FIG. 3.

In FIG. 3, the resistance R is the series resistance of the tunnel diode, the inductance L is the self-inductance of the loop around the hole 5, and the capacity C is the self-capacity of the circuit. The resistance $R_s$ is the series resistance of the photo-voltaic cell 2, whilst the capacity $C_s$ is the self-capacity of the cell, and the resistance $R_{sh}$ is the shunt resistance of the cell 2. The characteristics of the various elements may all be fairly precisely controlled by the method of fabrication.

FIG. 4 shows an alternative version of FIG. 1, but in this case the physical construction is annular instead of making the device from a flat piece of semiconductor material. This version of the oscillator may, if desired, be mounted on a coil form 5d together with the coupling coils 5a. In all cases where photo-voltaic cells are used to power solid-state circuits according to the invention, the biassing voltages can be readily adjusted by controlling the amount of light falling on the photo-voltaic cells.

In the amplifier shown in FIG. 5, a photo-voltaic cell formed by the junction of elements 6 and 10 provides bias through a diode 7, which includes the p-n junction with element 9 and the inductance of the circuit around the hole 8 to the collector 9 of a p-n-p common-emitter transistor. The said transistor comprises the p regions 9 and 10 and the n region 11. The base 11 of the transistor derives its bias from a second photo-voltaic cell 12 which includes the p-n junction of elements 10 and 11 through the loop circuit around the hole 13. The emitter 10 is continuous with the p-type layer of both photo-voltaic cells. Due to the phase reversal within the transistor, the input and output loops carry signal currents of opposite phase, and any inadvertent coupling existing between them will reduce the gain but will not lead to instability. The base bias may be adjusted by varying the light intensity falling on the photo-voltaic cell 12 either by using a separate light source or by interposing a translucent screen 14.

FIG. 6 gives the circuit for this type of amplifier. In this circuit, L1 is the inductance of the output loop 8, and L2 is the inductance of the input loop 13.

FIG. 7 shows an amplifier operating on the same principle as the previous example, but this amplifier has a different geometrical arrangement so that the base connection becomes the common point between the input and the output in place of the emitter as in FIG. 5. Since n-type base layer 11 is now common, a p-type layer 7a is placed between layers 6 and 11 to provide the proper junction arrangement and bias from the n-p junction 6, 7a of the solar cell through a diode formed by the junction of 7a with layer 11.

FIG. 8 shows the equivalent circuit for this form of amplifier.

FIG. 9 shows a multiple amplifier in which two, three or more transistors are directly connected in cascade with a common-collector configuration. The input impedance of this combination is very high, and the output impedance very low so that quite a small capacitor is required for input coupling and a small inductor, L3 shown schematically in FIG. 10, will serve for output coupling. The capacitor 15 may be formed by deposition of a metal layer on the oxide layer covering the base 16 of transistor T1. The emitter 17 of this transistor is directly connected to the base 18 of the transistor 72, the region of transition being doped to degeneracy to avoid the formation of a blocking junction at this point. The emitter 19 of the transistor T2 is likewise directly connected to the base 20 of the transistor T3. Power is derived from the photo-voltaic cell 22 connected between the emitter 21 and the common collector layer 23. The junction 24 so formed is forward-biassed and so has no detrimental effect at D.C. It is shunted by its self-capacity at radio frequencies.

FIG. 10 gives a suitable circuit for the amplifier shown in FIG. 9.

In FIG. 11, the input coils have been dispensed with, and the structure then takes the form shown. The emitter junction 10, 11 is illuminated and biasses itself in the forward direction. The signal must now be coupled in capacitatively as shown at 25 and 25a. This circuit is only suitable for use at relatively high frequencies, as otherwise the low impedance of the input would require a prohibitively large capacitance. Such an amplifier as that shown in FIG. 11 can be easily adapted to the construction shown in FIG. 1, which means that the active device may be made as small as is desired whilst the solar-cell part can be quite large, and the loop can be made large enough to give a sufficiently high inductance.

FIG. 12 is an alternative form of FIG. 11 wherein a common base again replaces the common emitter form as in FIGS. 5 and 7. The additional layer 7a provides the proper junctions and bias from the n-p solar cell 6 through a diode formed at the p-n junction with layer 11.

FIG. 13 shows a circuit in which the photo-voltage produced by illumination biasses the structure into a negative-resistance region. In an application, for instance, to computer circuitry, a memory circuit may be simply an array of such devices. In this circuit, the input 26 and the output 27 are capacitatively coupled at 28 and 29 respectively. The loop circuit incorporating the self-inductance 30 is not in direct contact with the input/output circuit at 31 but in capacitative contact at this point. The capacitance 32 is the self-capacitance of the circuit.

Figure 14:
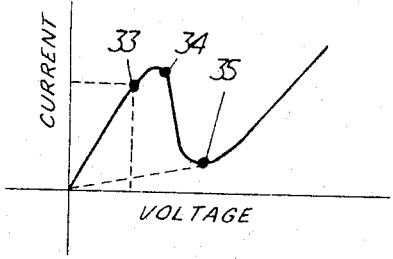
FIG. 14 depicts the tunnel-diode characteristic.

FIG. 14 shows a typical tunnel-diode characteristic. A small trigger pulse at the terminal 26 in FIG. 13 will move the bias point from the position 33 to the position 34. If the biassing from the photo-voltaic cell is unchanged, the bias point will continue to move to the position 35 on the tunnel-diode characteristic, and the circuit will then remain "ON" until switched off. During the transition a larger pulse is obtained at terminal 27 in FIG. 13. Switching off is accomplished by means of a large pulse of opposite polarity. Read-out is achieved by trying to switch the device on; if it is already on, no amplified output is obtained.

Figure 15:
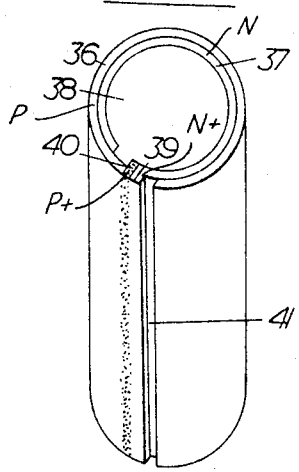
FIG. 15 shows how self-powered solid-circuits can be made in large sections.
Figure 16:
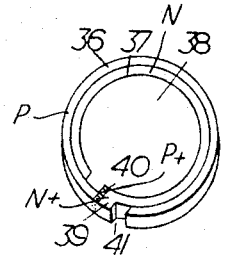
FIG. 16 shows one complete device cut from the mass shown in FIG. 15.

FIG. 15 shows how self-powered solid-circuits can be made in large sections by producing, by diffusion processes or other suitable means, two moderately doped layers 36 and 37 on the surface of a rod of semiconductor material 38. In this case, the rod 38 can be of a high-resistivity semi-conductor material such as silicon, and the layers 36 and 37 are of different conductivity types. The diffusion processes are arranged by suitable masking to give two narrow regions 39 and 40 of very high doping level. Region 39 is of the same conductivity type as layer 37, and region 40 is of the opposite type (i.e. the same as region 36). A slot or groove 41 is cut or etched to physically separate the region 39 from the layer 36. When such a complete bulk semiconductor mass has been produced, slices of suitable thickness are cut from it to form individual devices such as that shown in FIG. 16.

This particular device is typical of a solid-circuit, self-powered tunnel-diode oscillator in which the tunnel diode is formed at the junction of the regions 39 and 40. The photo-voltaic cell is formed by the layers 36 and 37 and the oscillatory current must flow around the periphery of the rod 38, this rod thus serving the same purpose as the hole in FIG. 4. This form of construction can be used to fabricate many other types of inductively-coupled, self-powered solid-circuit, the rod 1 serving as an inductive coupling loop in each case. Variations in the detailed arrangement of diffused layers and machined or etched slots can be made by known masking and diffusion techniques to produce the desired device or combination of devices.

Figure 17:
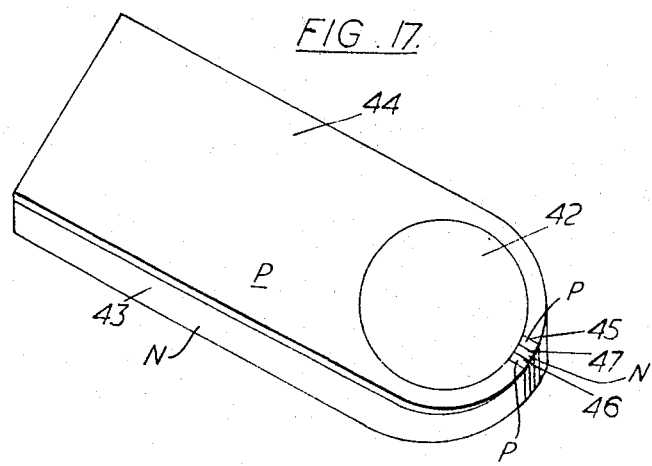
FIG. 17 shows the construction of a self-powered inductively-coupled, solid-circuit tunnel triode.
Figure 18:
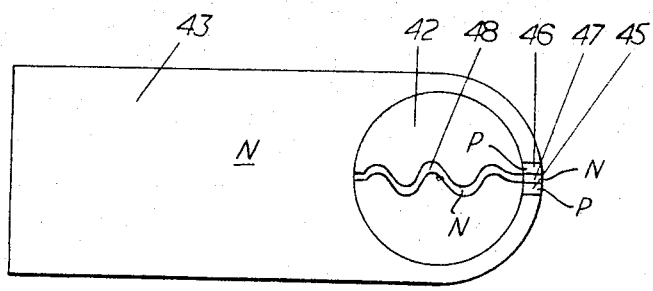
FIG. 18 shows the reverse view of FIG. 17.

FIG. 17 shows the construction of a self-powered, inductively-coupled, solid-circuit tunnel triode in which the original material is, for example, a high-resistivity semiconductor such as silicon, forming a body 42. By the use of suitable masking techniques, a deep n-type layer 43 is formed and a shallow p-type layer 44 is also formed, the two layers so produced thus providing a photo-voltaic cell. The remaining circular portion 42 of the body is unchanged. A p-n-p tunnel triode is formed by providing two p-type regions 45 and 46 on either side of an n-type region 47. Contact between the n-type region 47 and the photo-voltaic cell can be established by means of a thin strip of n-type material 48 which is shown in FIG. 18. This strip of material may be straight or may zigzag as shown depending on the resistance required in this connection. Again, the circular region 42 provides for inductive coupling between the external circuits and the currents flowing around the periphery of the portion 42.

It will be apparent that the invention is not limited to the particular constructions given or to the particular circuits depicted but it can be used for many semiconductor devices which are capable of being formed out of semiconductor elements in the manner described. Furthermore, several such devices can be incorporated in a common circuit by fabricating them so that they can be simply stacked together in a suitable manner to provide the required coupling between adjacent devices. Alternatively, individual devices can be stacked with inter-leaved metal foil or metallized dielectric foil to provide the required coupling.

In all the examples given, the power source has been shown as a photo-voltaic cell. Certain materials such as radio-strontium may be used as sources of radio-active particles which, on impinging on a p-n junction, produce an output in much the same way as a photo-voltaic cell.

Such a radio-active power source may be incorporated in any of the devices described, in place of the photo-voltaic cell. If it is not desired to make the devices self-powered, the methods described for inductively or capacitatively coupling the signal currents may also be used to couple the devices with a radio-frequency power supply which is then rectified within the device, a rectifier taking the place of the photo-voltaic cell where applicable.

What we claim is:

1. A semiconductor solid-state circuit comprising a semiconductor block having a hole therein, a plurality of contacting semiconductor elements of opposite conductivity types comprising a plurality of semiconductor devices within said block disposed around the periphery of said hole and having a plurality of junctions between said opposite conductivity elements, one of said junctions including input and output electrodes comprising a first of said semiconductor devices, said elements including output coupling means having a self-inductive semiconductor loop around said hole, and a second junction including electrodes comprising a second of said semiconductor devices supplying direct voltage to said circuit to cause a current path around said loop.

2. The device of claim 1 wherein said second junction includes opposite polarity electrodes of a direct voltage cell integral with said block.

3. The device of claim 1 including a second hole in said block surrounded by said semiconductor elements, said elements including input coupling means having a self-inductive loop around said second hole.

4. The device of claim 1 including external coupling means disposed adjacent said self-inductive loop.

5. The device of claim 1 wherein a common semiconductor element of one conductivity type includes one electrode of each of said first and second semiconductor devices.

6. The device of claim 1 wherein said hole is filled with a solid high resistivity material.

7. The device of claim 1 including capacitive coupling means disposed adjacent said semiconductor block, said capacitance means including a metallic layer insulatingly positioned on said semiconductor block.

8. The device of claim 1 wherein a ferrite slug is positioned in said hole.

9. The device of claim 1 including semiconductor elements having different resistivities.

10. The device of claim 2 wherein said direct voltage cell is a photovoltaic cell.

11. The device of claim 4 wherein said external coupling means is a coil.

12. The device of claim 10 wherein said first semiconductor device is a tunnel diode.

13. The device of claim 10 wherein said first semiconductor device comprises a common electrode having a junction with one of said input and output electrodes.

14. The device of claim 11 wherein a rod of high resistivity material is positioned in said hole.

References Cited by the Examiner

UNITED STATES PATENTS

| | | | |
|---|---|---|---|
| 2,824,977 | 2/1958 | Pankove | 317—235 |
| 2,944,165 | 7/1960 | Stuetzer | 250—211 |
| 3,048,797 | 8/1962 | Linder | 317—235 |
| 3,050,638 | 8/1962 | Evans et al. | 307—88.5 |
| 3,050,684 | 8/1962 | Sclar | 250—211 |
| 3,079,512 | 2/1963 | Rutz | 250—211 |
| 3,134,905 | 5/1964 | Pfann | 250—211 |

RALPH G. NILSON, *Primary Examiner.*

JOHN W. HUCKERT, *Examiner.*

J. J. JORDAN, W. STOLWEIN, *Assistant Examiners.*